Patented Dec. 12, 1950

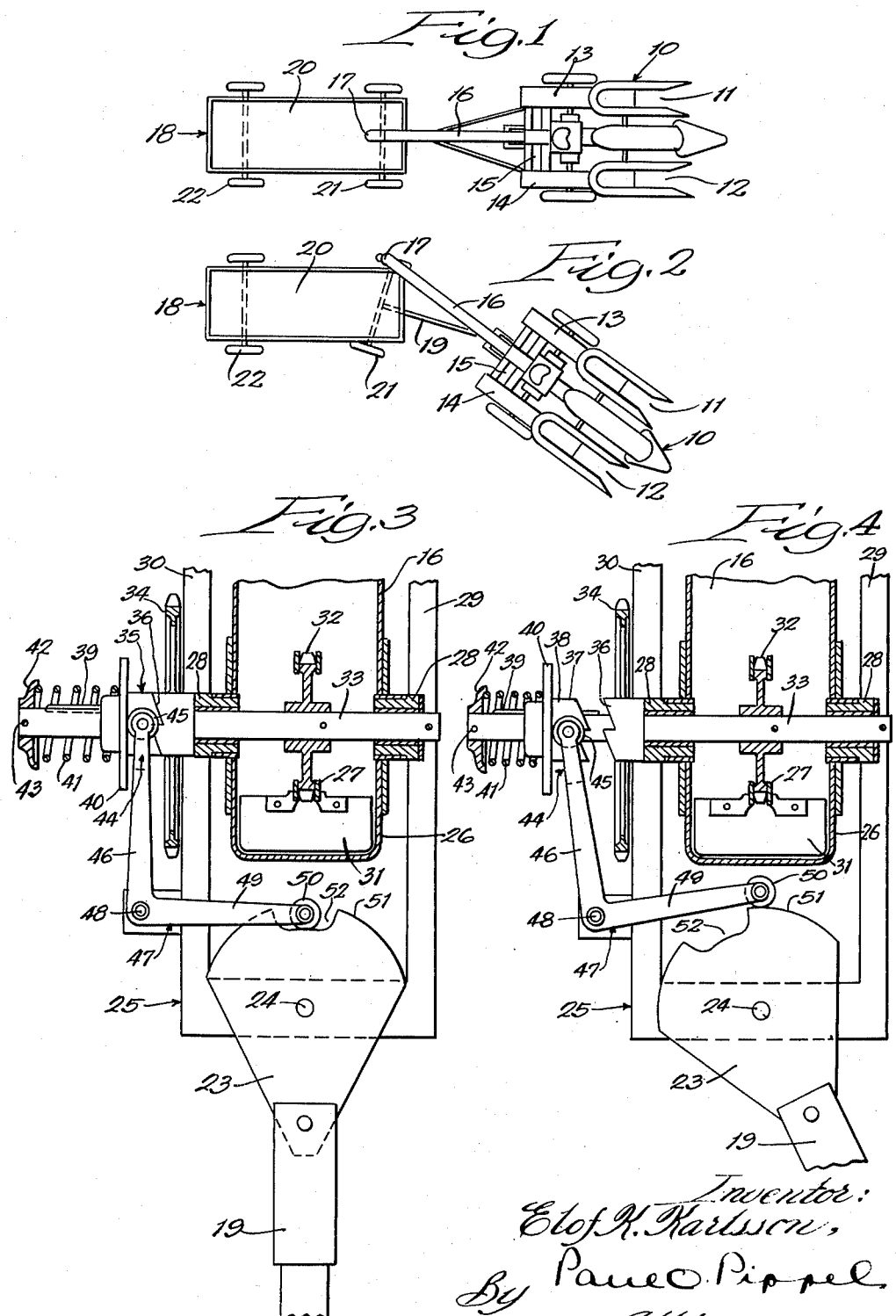

2,533,814

UNITED STATES PATENT OFFICE 2,533,814

WAGON ELEVATOR THROW-OUT MECHANISM

Elof K. Karlsson, Moline, Ill., assignor to International Harvester Company, a corporation of New Jersey Application October 27, 1945, Serial No. 625,012

6 Claims. (Cl. 214—42)

This invention relates to a new and improved wagon elevator throw-out mechanism and has for one of its principal objects the provision of means for causing a farm implement wagon discharge elevator to have its operation stopped during turning of the implement.

Field operating farm implements such as corn pickers, harvester threshers, ensilage harvesters, hay choppers, and others are adapted to pull trailing wagons and further are equipped with means for elevating a treated crop to the trailing wagon. The elevators employed on these farm implements are ordinarily attached solely to the implement and hence move simultaneously with the implement. Therefore, if the implement is turned, the wagon elevator swings on an angle identical to that of the turned implement. The wagon elevator is normally adjusted to discharge into the center of the trailing wagon box. However, upon turning a corner, the discharge of the wagon elevator swings to one side of the wagon depending upon which way the implement is turned and oftentimes swings to a position beyond the confines of the wagon box so that the treated crop is discharged outside of the wagon, and hence during operation over an entire field a good portion of the valuable crop is lost.

It is, therefore, an important object of this invention to provide a wagon elevator clutch operating means responsive to turning of the implement with respect to the trailing wagon for the purpose of causing the elevator drive to cease during the time when the implement is turning with respect to the trailing wagon.

Other and further important objects of this invention will become apparent from the disclosures in the following specification and accompanying drawing, in which:

Figure 1 is a top plan view of a farm implement and trailing wagon employing the wagon elevator throw-out mechanism of this invention;

Figure 2 is a view similar to Figure 1 showing the implement turning and the elevator swung outwardly to a position beyond the trailing wagon box;

Figure 3 is a horizontal sectional view taken through the throw-out mechanism of this invention during the time when the implement and trailing wagon are in the position as shown in Figure 1; and Figure 4 is a view similar to Figure 3 taken at a time when the implement and trailing wagon are in the position as shown in Figure 2.

The reference numeral 10 indicates generally a corn picker having gathering units 11 and 12, snapping units 13 and 14, and a husking unit 15 adapted to feed the snapped and husked ears of corn to the lower end of a wagon elevator 16 which has a discharge spout 17.

As shown in Figure 1, this discharge spout 17 of the wagon elevator 16 is positioned centrally of a trailing wagon 18 hitched by means of its forwardly extending tongue 19 to the rear of the corn picking machine 10. The trailing wagon 18 is equipped with a rectangular box 20 mounted on a front wheel truck 21 and a rear wheel truck 22.

As shown in Figure 2, the corn picker 10 is shown after it has been turned through an angle of approximately thirty degrees. In this position the discharge spout 17 of the wagon elevator 16 has swung to a position outside the confines of the wagon box 20 so that the corn being carried up the elevator 16 will be discharged onto the ground. This is actually what happens in the use of present day corn pickers or other farm implements if the throw out clutch is not disengaged by the operator when the machine turns corners at the ends of the field. It will be realized that considerable loss of crop is occasioned by such an occurrence. When an implement such as a corn picker is turning a corner at the end of a field, the quantity of treated crop being fed to the elevator is at a minimum, and hence it is perfectly safe to halt operation of the elevator during the time in which the implement is being turned without fear of subsequently causing an overload of the elevator and possibly a jamming or clogging of the elevator which would necessitate a clean-out.

As best shown in Figure 3, the tongue 19 of the trailing wagon 18 is equipped at its forward end with a plate-like member 23 which is pivoted for horizontal swinging movement at 24 on a draw-bar or the like 25 extending rearwardly from the corn picker 10. The lower end 26 of the wagon elevator 16 lies within the U-shaped draw-bar 25 and has its elevating conveyor 27 journaled at 28 above the forwardly projecting legs 29 and 30 of the draw-bar 25. The elevating conveyor 27 is equipped with flight members 31 at substantially regular intervals around the length thereof and the conveyor portion 27 constitutes a chain which is wrapped around a sprocket 32 and a similar corresponding sprocket, not shown, at the upper end of the wagon elevator 16. The sprocket 32 is fastened to a cross-shaft 33 mounted within the opposed journal bearings 28. A driving sprocket 34 is journaled for separate rotation on an outer extension of the shaft 33 and secures its rotational drive from a tractor power take-off (not shown).

A clutch 35 consists of a clutch face 36 on the driving gear 34 and a cooperating clutch face 37 on a sleeve-like member 38. The sleeve member 38 is keyed to the shaft 33 as shown at 39 and hence rotates with the shaft 33. It is obvious that when the clutch faces 36 and 37 are engaged, as shown in Figure 3, the driving gear 34 will cause the sleeve 38 to be driven, and this sleeve will in turn drive through the key 39 to the shaft 33 causing the elevator and its conveyor 27 to be in operation.

The sleeve member 38 is equipped with an enlarged annular flange 40 which directly receives the action of a spring 41 constantly tending to join and maintain the clutch faces 36 in driving engagement. The spring 41 is supported at its other end by the cap member 42 fastened to the shaft 33 by means of a pin or the like 43.

A yoke member 44, each arm of which carries a roller 45, is adapted to act directly against the inner surface of the annular flange 40 of the sleeve member 38. When the yoke 44 is shifted from its position as shown in Figure 3 to the position as shown in Figure 4, the clutch faces 36 and 37 are disengaged against the action of the spring 41 thus causing drive to the elevator to halt. The yoke 44 thus acts to disengage the clutch whereas the spring 41 acts to engage the clutch. This yoke 44 is formed at the end of an arm 46 forming one side of a bell-crank lever 47 pivoted at 48. The other arm 49 of the bell-crank lever 47 carries a roller 50 adapted to ride along the inner edge 51 of the plate 23 attached to the forward end of the wagon tongue 19.

The forward edge 51 of the plate 23 is equipped with a relatively smooth arcuate surface with the exception of a cutout portion 52 in the center thereof. As shown in Figure 3, the bell-crank roller 50 is positioned within this cut-out portion 52 in the plate 23 and during the time the roller 50 is within this cut-out portion 52, the clutch 35 is engaged so that the wagon elevator is continuously driven. When, however, the implement is turned and the wagon elevator is swung to one side where there is a possibility that it will discharge beyond the trailing wagon, the U-shaped draw-bar 25 on the implement 19 is also swung angularly with respect to the tongue 19 of the trailing wagon. This angular movement with respect to the tongue 19 causes the roller 50 on the bell-crank lever 47 to ride up and out of the cut-out portion 52, thus acting as a cam and causing the bell-crank lever to be rotated about its pivot 48. The yoke 44 through the rollers 45 acts in a leftward direction against the annular flange 40 thus disengaging the drive sprocket 34 from driving relationship with the conveyor 27 in the wagon elevator.

It will thus be seen that when the implement is turned the power to the wagon elevator is disconnected thus insuring that no treated crop will be discharged on the ground. It is obvious that just as soon as the implement and trailing wagon resume their straight-line relationship the clutch 35 will become reengaged and elevator driving will resume.

Numerous details of construction may be varied throughout a wide range without departing from the principles disclosed herein, and I therefore do not propose limiting the patent granted hereon otherwise than as necessitated by the appended claims.

What is claimed is:

1. For a field-traversing farm implement having a trailing wagon hitched thereto, a power-operated wagon elevator attached to said implement and adapted to elevate treated crops to said trailing wagon, said trailing wagon having a forwardly extending tongue for hitching to said implement, and means associated with the tongue and the implement for controlling the power operation of said wagon elevator, said means including a clutch and clutch actuator means adapted to engage said clutch when the implement and forwardly extending wagon tongue are in straight-line relationship and to disengage said clutch when said wagon tongue is angularly disposed with respect to said implement.

2. For a field-traversing farm implement having a trailing wagon hitched thereto, a power operated wagon elevator attached to said implement and adapted to elevate treated crops to said trailing wagon, said trailing wagon having a forwardly extending tongue for hitching to said implement, clutch means mounted on said implement for controlling the power operated wagon elevator, and cam means for causing engagement or disengagement of said clutch means, said cam means comprising a plate angularly swingable in response to angular movement of the implement with respect to the trailing wagon.

3. For a field-traversing farm implement having a trailing wagon hitched thereto, a power-operated wagon elevator attached to said implement and adapted to elevate treated crops to said trailing wagon, said trailing wagon having a forwardly extending tongue for hitching to said implement, means associated with the tongue and the implement for controlling the operation of the power-operated wagon elevator, said means including a clutch mounted on the implement, cam means on said wagon tongue for causing engagement or disengagement of said clutch, said cam means comprising a plate angularly swingable in response to angular movement of the implement with respect to the trailing wagon, lever means associated with said cam means for directly swinging said clutch into and out of engagement.

4. For a field-traversing farm implement having a trailing wagon hitched thereto, a power-operated wagon elevator attached to said implement and adapted to elevate treated crops to said trailing wagon, said trailing wagon having a forwardly extending tongue for hitching to said implement, means associated with the tongue and the implement for controlling the operation of the power-operated wagon elevator, said means including a clutch mounted on the implement, cam means on said wagon tongue for causing engagement or disengagement of said clutch, said cam means comprising a plate angularly swingable in response to angular movement of the implement with respect to the trailing wagon, said plate having a smooth arcuate surface with a central notch.

5. For a field-traversing farm implement having a trailing wagon hitched thereto, a power-operated wagon elevator attached to said implement and adapted to elevate treated crops to said trailing wagon, said trailing wagon having a forwardly extending tongue for hitching to said implement, means associated with the tongue and the implement for controlling the operation of the power-operated wagon elevator, said means including a clutch mounted on the implement, cam means on said wagon tongue for causing engagement or disengagement of said clutch, said cam means comprising a plate angularly swingable in response to angular movement of the implement with respect to the trailing wagon, said plate having a smooth arcuate surface with a central notch, and a bell-crank lever positioned for horizontal swinging movement, one end of said bell-crank lever adapted to ride on the surface of said plate, the other end of said bell-crank adapted to actuate said clutch, and the one end of the bell-crank lever resting in said notch when the implement and trailing wagon are in straight-line relationship, and the one end of the bell-crank lever riding out of the notch when the implement and wagon assume an angular relationship of less than a straight angle, whereby in said last-named position the other end of said bell-crank causes the clutch to disengage.

6. For a field-traversing farm implement having a trailing wagon hitched thereto, a power-operated wagon elevator attached to said implement and adapted to elevate treated crops to said trailing wagon, said trailing wagon having a forwardly extending tongue for hitching to said implement, means associated with the tongue and the implement for controlling the operation of the power-operated wagon elevator, said means including a clutch mounted on the implement, cam means on said wagon tongue for causing engagement or disengagement of said clutch, said cam means comprising a plate angularly swingable in response to angular movement of the implement with respect to the trailing wagon, said plate having a smooth arcuate surface with a central notch, and a bell-crank lever mounted for horizontal swinging movement, rollers on the ends of said bell-crank lever arms, one of said rollers adapted to ride on said plate surface and engage the notch when the implement and wagon are in straight-angle relationship and ride out of the notch when the implement and wagon are in less than straight-angle relationship, and the other of said rollers adapted to move the clutch into and out of engagement during respective movements of said first-named roller.

ELOF K. KARLSSON.

REFERENCES CITED

The following references are of record in the file of this patent:

UNITED STATES PATENTS

| Number | Name | Date |
|---|---|---|
| 1,275,680 | Harsh | Aug. 13, 1918 |
| 1,474,383 | Russell | Nov. 20, 1923 |
| 2,325,833 | Cook | Aug. 3, 1943 |